2,924,589
PROCESS OF POLYMERIZATION OF VINYL COMPOUNDS

Wolfgang Jurgeleit, Obernburg am Main, Germany, assignor to Vereinigte Glanzstoff-Fabriken Aktiengesellschaft, Wuppertal-Elberfeld, Germany, a German joint-stock company No Drawing. Application January 13, 1955
Serial No. 481,701

3 Claims. (Cl. 260—67)

This invention relates to the polymerization of vinyl compounds.

It is an object of this invention to improve the processes of polymerization of such compounds which occur at low temperatures.

As is well known to those skilled in the art there are two ways of polymerizing them. One way is the polymerization with the aid of free radicals which can for instance be obtained in the thermical decomposition of peroxides. Another way is the generation of a so-called polymerization of ion chains which is obtained by the action of acid or basic catalysts.

The polymerization processes induced by the presence of free radicals, in order to be effective at a satisfactory speed require operation at higher temperatures. It has, however, been found that in a great number of cases it is desirable to carry through the polymerization at a very low temperature, because then ramifications of the macromolecules which form, are normally fewer in number. Obviously such ramifications have a tendency to impair the properties of the highly polymerized substances. They more particularly exert an unfavorable influence on the formation of crystallite and thereby impair the strength of fully synthetic filaments.

In order to be able to operate such a process at a low temperature down to about −90° C., it has been suggested to polymerize vinyl compounds with acid substances according to the mechanism of cationic ion chains. Polymerization processes according to this mechanism have also been carried through under industrial conditions, for instance when preparing polyisobutylene with the aid of Friedel-Crafts catalysts. Other vinyl compounds can be polymerized at a low temperature according to an anionic mechanism of ion chains. However, these processes have not been used frequently in practice since one has found that great difficulties are encountered therein.

Thus for instance the anionically proceeding polymerization of acrylonitrile with sodium in liquid ammonia has been found to be a very complicated procedure. Apart from this the yield of polymers obtained in these processes frequently remains very low. In quite a number of cases the polymer obtained in this way is strongly discolored.

I have now found rather surprisingly that polymerization which leads to valuable high polymer products, provided the presence of water is carefully excluded, can be obtained if tertiary phosphines are made to act on vinyl compounds including an electron-attracting substituent (see for instance B. Eistert, "Chemismus und Konstitution," Stuttgart 1948, pp. 132 and 206 et seq.). In this way all those compounds can be polymerized in a simple manner which otherwise as indicated above, have to be polymerized in a very complicated process with the aid of basic catalysts according to the anionic ion chain mechanism.

Polymerizations carried through with the aid of tertiary phosphines in the absence of water have been found to proceed very smoothly and at a high velocity. On the velocity of the polymerization process temperature has only very little influence. It is thus possible for instance to convert acrylonitrile at a temperature of −70° C. in a short time into a high polymer product by adding very small quantities of triethylphosphine. In this process the yield of polyacrylonitrile is practically quantitative.

Instead of acrylonitrile also many other vinyl compounds can be polymerized in an analogous manner.

In the case of vinyl compounds which contain a strongly electron-attracting substituent polymerization occurs with quite particular velocity. If the compounds contain substituents with lower electron-attracting effect polymerization occurs at a lower rate.

Of vinyl compounds containing substituents of electron-attracting character in the process here described I have used for instance acrylonitrile, acrylic acid, methacrylic ester, acrolein, methylvinylketone, cyansorbic acid ester and others.

I have found that triethyl phosphine is particularly effective in inducing polymerization, however also other trialkyl phosphines such as for instance trimethyl phosphine or tri-n-butyl phosphine can be used. On the other hand aromatic phosphines such as for instance triphenyl phosphine are less effective and are practically useful only in a certain number of cases.

In order to be able to carry through polymerization with the aid of tertiary phosphines it is essential that water be kept away altogether. Even small quantities of water greatly impair the quality of the polymerizates obtained. For instance if to a polymerization mixture containing acrylonitrile and small quantities of triethyl phosphine, which had been treated in the most carefully effected absence of water, a single drop of water is added, there is obtained, instead of the high molecular solid white polyacrylonitrile a highly viscous resin of greenish-brown coloring.

In the practical operation of the process according to this invention I may for instance proceed as follows:

Example I

To 5.3 gr. (equal to 0.1 mol) anhydrous acrylonitrile there is added slowly dropwise at a temperature of −70° C. under intensive agitation a dilute solution of triethyl phosphine in petrol ether. After a short start of about 2–3 minutes a rapid polymerization takes place and the whole of the acrylonitrile is converted into a white polymer. In order to keep away any moisture of the air and to avoid a premature oxidation of the triethyl phosphine by contact with the oxygen of the air, I prefer working in a nitrogen atmosphere. The relative viscosity $\eta$ rel. of the polymerization in a 1% solution in dimethylformamide is 2.14.

Example II 53 gr. (equal to 1 mol) acrylonitrile are distributed by intensive stirring in the form of very fine droplets in 230 ccm. decahydronaphthalene. The operation is carried on at a temperature of 25° C. The presence of a nitrogen atmosphere keeps away the air moisture and the oxygen. After adding a solution of 206 mg. (equal to 1.75 m. mol) triethyl phosphine in 20 ccm. decahydronaphthalene polymerization occurs at once and on heating to about 35–40° C. for half an hour a polymer ($\eta$ rel. equal to 1.88) is obtained in quantitative yield. By cooling the reaction vessel from the outside, the temperature can be maintained at 25° C. during the polymerization. I have now been able to notice any influence on the rapidity of polymerization as compared with an equal processing without any such cooling.

Example III 5.3 gr. (equal to 0.1 mol) anhydrous acrylonitrile were dissolved in 40 cm. petrol ether and to this solution was added slowly at a temperature of −25° C. in a nitrogen atmosphere a solution of 118 mg. (equal to 1 m. mol) triethyl phosphine in 11 ccm. petrol ether. After the lapse of about 5–7 minutes polymerization has come to an end and the yield of polyacrylonitrile ($\eta$ rel. equal to 1.92) amounted to 84%.

Example IV 16.8 g. (equal to 0.3 mol) acrolein were dissolved in 100 ccm. petrol ether and to the solution was added at 20° C. a solution of 118 mg. (equal to 1 m. mol) triethyl phosphine in 11 ccm. petrol ether. Polymerization ensues quickly, the reaction mixture getting moderately warmer. The polymer is obtained in a quantitative yield in the form of a yellowish white insoluble powder.

Various changes may be made in the sequence of operations and the starting products used without departing from the invention or sacrificing the advantages thereof.

I claim:
1. The method of polymerizing a monomer selected from the group consisting of acrylonitrile and acrolein which comprises polymerizing the anhydrous monomer in an inert hydrocarbon diluent in the absence of any water and in the presence of a trialkylphosphine as the catalyst.
2. The method of claim 1 in which the diluent is decahydronaphthalene.
3. The method of claim 1 in which the diluent is petroleum ether.

References Cited in the file of this patent

UNITED STATES PATENTS

| | | |
|---|---|---|
| 2,375,256 | Soday | May 8, 1945 |
| 2,608,554 | Bullitt | Aug. 26, 1952 |
| 2,608,555 | Bullitt | Aug. 26, 1952 |
| 2,675,372 | Coover et al. | Apr. 13, 1954 |

OTHER REFERENCES

Houtz: Textile Research Journal, vol. 20, November 1950, p. 796. (Copy in Scientific Library.)